(12) United States Patent
Wakamatsu et al.

(10) Patent No.: US 8,129,553 B2
(45) Date of Patent: Mar. 6, 2012

(54) METHOD OF PRODUCING OF FATTY ACID ALKYL ESTERS AND SYSTEM OF PRODUCING FATTY ACID ALKYL ESTERS

(75) Inventors: Mikito Wakamatsu, Yokohama (JP); Teruhiro Isayama, Yokohama (JP); Makoto Hattori, Nagoya (JP); Hiroshi Murakami, Nagoya (JP); Nobuaki Hamanishi, Nagoya (JP); Takeshi Sakakibara, Nagoya (JP)

(73) Assignees: Wakamatsu Corporation, Yokohama-Shi, Kanagawa (JP); Toyota Tsusyo Corporation, Nagoya-Shi, Aichi (JP); Toyota Chemical Engineering Co., Ltd., Nagoya-Shi, Aichi (JP)

( * ) Notice: Subject to any disclaimer, the term of this patent is extended or adjusted under 35 U.S.C. 154(b) by 378 days.

(21) Appl. No.: 12/063,578

(22) PCT Filed: Jul. 2, 2007

(86) PCT No.: PCT/JP2007/063235
§ 371 (c)(1),
(2), (4) Date: Aug. 29, 2008

(87) PCT Pub. No.: WO2008/001934
PCT Pub. Date: Jan. 3, 2008

(65) Prior Publication Data
US 2009/0292133 A1      Nov. 26, 2009

(30) Foreign Application Priority Data
Jun. 30, 2006   (JP) .................... 2006-182814

(51) Int. Cl.
*C11C 3/10* (2006.01)
(52) U.S. Cl. ................... 554/169; 554/174
(58) Field of Classification Search .......... 554/174, 554/169
See application file for complete search history.

(56) References Cited

U.S. PATENT DOCUMENTS
4,303,590 A   12/1981   Tanaka et al.
(Continued)

FOREIGN PATENT DOCUMENTS
JP       56-65097 A     6/1981
(Continued)

OTHER PUBLICATIONS

Nooureddini et al., A continuous process for the conversion of vegetable oils into biodiesel, 1996, University of Nebraska, Lincoln, (15 pages).*
Ma, F. et al., Biodiesel production: a review, 1999, Bioresource Technology, 70, pp. 1-15.*
SK285727 B6 (SK2003-1363 A3, May 5, 2006) English Abstract (1 page).*

(Continued)

*Primary Examiner* — Yate K Cutliff
(74) *Attorney, Agent, or Firm* — Roberts Mlotkowski Safran & Cole P.C.

(57) ABSTRACT

Provided is a method of producing fatty acid alkyl esters at high reaction efficiency, wherein the impurities inhibiting the reaction such as water are removed sufficiently.

The fatty acid alkyl esters are produced efficiently, by a method of producing fatty acid alkyl esters, at least comprising (A) a step of removing at least water from an oil/fat raw material, (B) a step of converting the fatty acid glycerides contained in the oil/fat raw material into fatty acid alkyl esters and reducing the triglyceride content in the fatty acid alkyl esters obtained to 0.1 wt % or less by fine-particle dispersion and agitation, and (C) a step of separating at least glycerol from the mixture containing fatty acid alkyl esters.

7 Claims, 2 Drawing Sheets

U.S. PATENT DOCUMENTS

| | | | |
|---|---|---|---|
| 5,514,820 A * | 5/1996 | Assmann et al. | 554/167 |
| 6,015,440 A * | 1/2000 | Noureddini | 44/388 |
| 6,489,496 B2 * | 12/2002 | Barnhorst et al. | 554/169 |
| 6,752,529 B2 * | 6/2004 | Holl | 366/279 |
| 7,247,739 B2 * | 7/2007 | Gapes et al. | 554/174 |
| 2002/0013486 A1 | 1/2002 | Ergun et al. | |
| 2004/0087809 A1 | 5/2004 | Nakayama et al. | |
| 2005/0016059 A1 * | 1/2005 | Kovacs et al. | 44/401 |
| 2006/0224005 A1 * | 10/2006 | Felly | 554/174 |

FOREIGN PATENT DOCUMENTS

| | | |
|---|---|---|
| JP | 2001-524553 A | 12/2001 |
| JP | 2002-294277 A | 10/2002 |
| SK | 285721 * | 5/2005 |

OTHER PUBLICATIONS

Ruiz, R.P., Karl Fischer Tigration, 2001, Current Protocols in Food Analytical Chemistry, Unit A1.2, pp. A1.2.1-A1.2.4 (4 pages).*

* cited by examiner

[Figure 1]
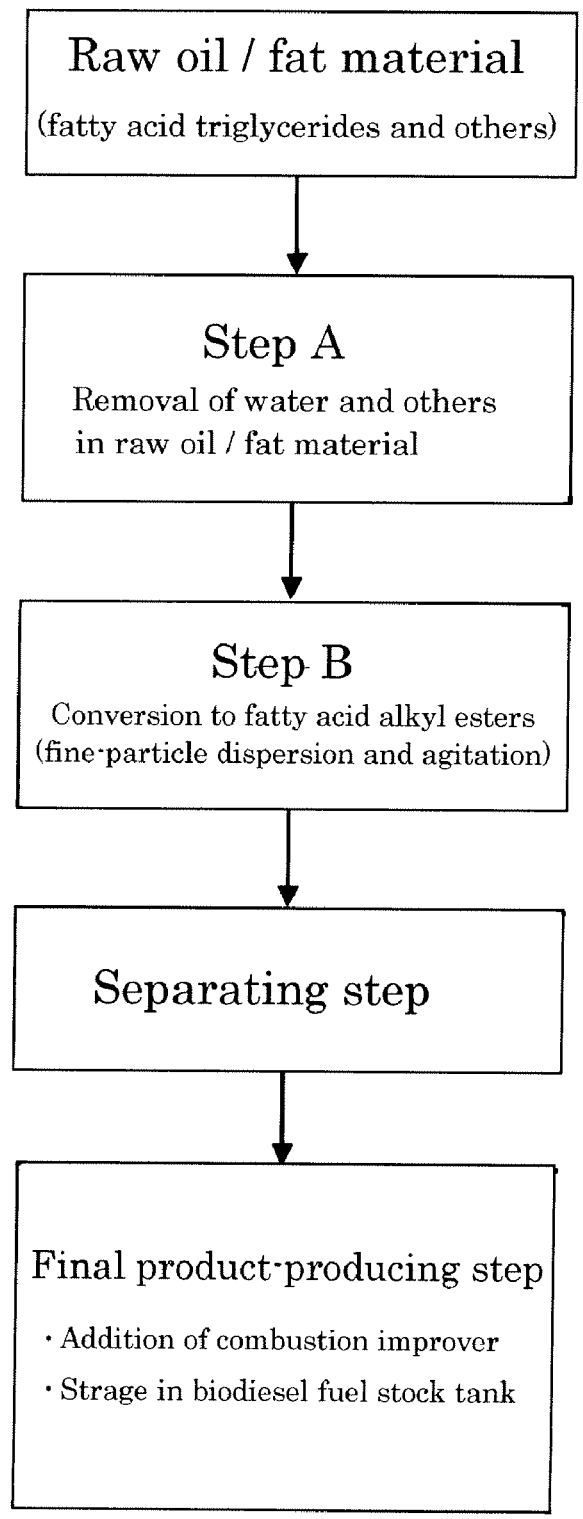

[Figure 2]
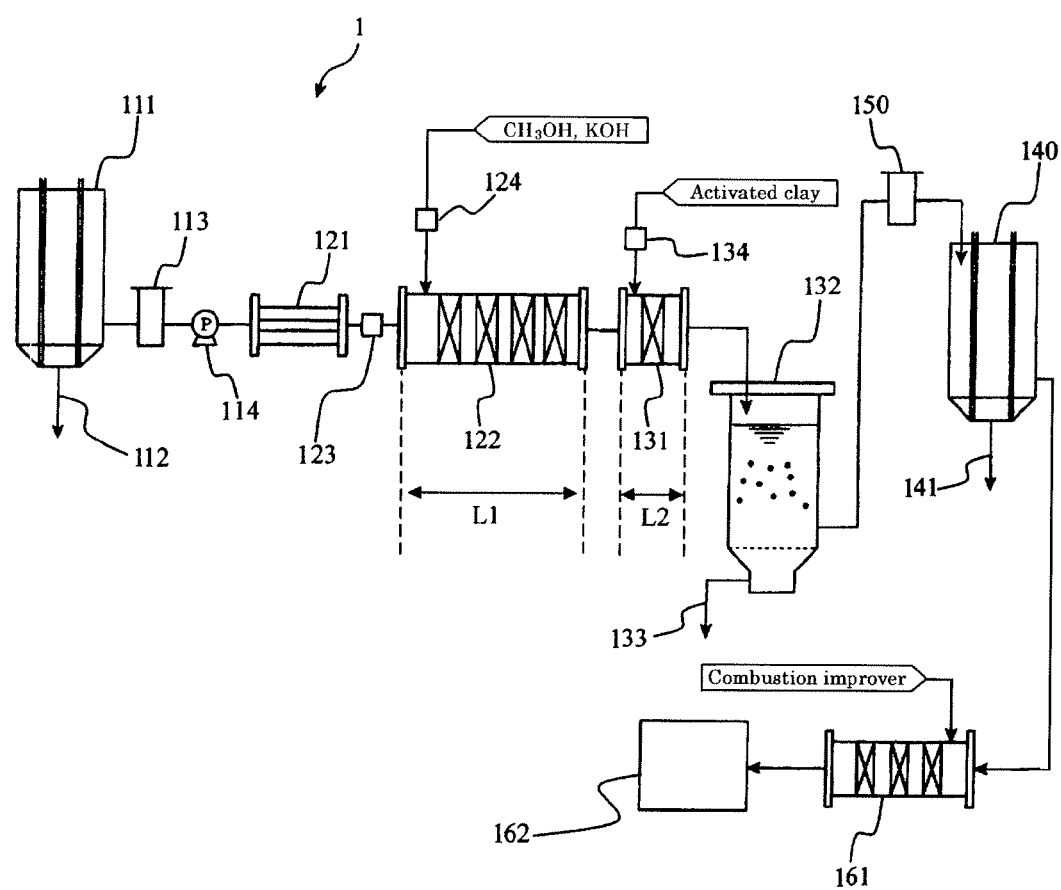

METHOD OF PRODUCING OF FATTY ACID ALKYL ESTERS AND SYSTEM OF PRODUCING FATTY ACID ALKYL ESTERS

TECHNICAL FIELD

The present invention relates to a method of producing fatty acid alkyl esters (also referred to as "fatty acid esters"). More specifically, it relates to a method of producing fatty acid alkyl esters for use as a biodiesel fuel and a system of producing the same.

BACKGROUND ART

Diesel engines (used for example in vehicles, ships, and machines) using light oil as a fuel are fuel-efficient, but there are recently some problems because the exhaust gas has adverse effects on the environment. Accordingly, biodiesel fuels are attractive as an alternate fuel for use in the diesel engines.

The biodiesel fuel is a fuel containing fatty acid alkyl esters obtained, for example, by ester exchange of fatty acid triglycerides (referred to also as "fatty acid glycerides"), principal components of the vegetable oils/fats, animal oils/fats or the waste oils/fats thereof, with a lower alcohol or by esterification of the free fatty acid products generated by hydrolysis of the fatty acid triglycerides with a lower alcohol.

Carbon dioxide generated from the biodiesel fuel is the carbon dioxide originally presence in air that was absorbed by vegetables for oil/fat raw materials such as soybean and rapeseed. Therefore, the biodiesel fuel, which is a carbon-neutral fuel that does not destroy the carbon balance on earth, is attractive as an alternative fuel for fossil fuels.

Alkali-catalyzed methods have been used as an industrial production method for production of the biodiesel fuel fatty acid alkyl esters. The alkali-catalyzed method is a method of ester-exchanging the fatty acid triglycerides with an alcohol in the presence of an alkali metal catalyst at a temperature close to the boiling point or at normal temperature. The method, which does not demand such a high-temperature and high-pressure condition as those by the supercritical methanolysis method and has a catalytic activity in the ester-exchange reaction higher than that for example by acid-catalyzed methods, allows relatively more cost-effective and easier progress of the ester-exchange reaction. Therefore, the alkali-catalyzed method is important as an industrial production process for the biodiesel fuel.

However, the alkali-catalyzed method also has various disadvantages. First, the biodiesel fuel for use should be high-quality fatty acid alkyl esters extremely lower in impurity content. In particular, disadvantages of a biodiesel fuel by the alkali-catalyzed method include by-production of an alkali soap, difficulty of phase separation between the fatty acid alkyl ester phase and the glycerol phase because of the alkali soap, and difficulty in separating activated clay added for neutralization of the reaction solution and the metal alcoholate used as an alkali metal catalyst.

In addition, ester-hydrolyzing impurities such as water are contained in greater amounts for example in the waste oil/fat raw materials, and it is important to remove water in the oil/fat raw material prior to reaction. Patent Document 1 discloses a method of producing fatty acid lower alcohol esters having an adjusting step of adding water to an esterification mixture and agitating the mixture, as the method of overcoming such problems associated with separation.

Patent Document 1: Japanese Unexamined Patent Publication No. Sho56-65097

DISCLOSURE OF THE INVENTION

Problems to be Solved by the Invention

However, addition of water or the like in preparation of high-purity fatty acid alkyl esters is nothing but addition of an impurity inhibiting the reaction to the fatty acid alkyl esters, and thus, such a method is unfavorable as the method of producing high-purity fatty acid alkyl esters for use as a biodiesel fuel. In addition, the method undesirably demands an additional separation operation for removal of the added water, glycerol and others.

Alternatively, the oil/fat raw material is often dehydrated by heating to a particular temperature under vacuum generated by vacuum pump before ester-exchange reaction, but such a method demands a large-scale vacuum apparatus and also a great amount of heat energy for the step and thus demands further improvement.

An object of the present invention is to provide a high-yield and high-efficiency method of producing fatty acid alkyl esters wherein the reaction-inhibiting impurities such as water are removed effectively.

Means to Solve the Problems

The inventors have conducted intensive studies on the industrially feasible and efficient method of producing fatty acid alkyl esters, focusing on the alkali-catalyzed method, the mainstream production method for fatty acid alkyl esters, and found a new large-scale production method in ester-exchange reaction wherein impurities such as water are removed from the reaction system and water is used in an amount as low as possible.

The present invention provides first a method of producing fatty acid alkyl esters, at least comprising (A) a step of removing at least water from an oil/fat raw material, (B) a step of converting the fatty acid glycerides contained in the oil/fat raw material into fatty acid alkyl esters and reducing the triglyceride content in the fatty acid alkyl esters obtained to 0.1 wt % or less by fine-particle dispersion and agitation, and (C) a step of separating at least glycerol from the mixture containing fatty acid alkyl esters. It is thus possible to obtain high-purity fatty acid alkyl esters.

Additionally, the present invention provides the method of producing fatty acid alkyl esters, wherein alcohols are used in an amount of 5 moles or less with respect to 1 mole of the oil/fat raw material in the step (B). It is possible to perform the step (B) efficiently, even when the amount of the alcohol used is small.

Yet additionally, the present invention provides the method of producing fatty acid alkyl esters, wherein the fine-particle dispersion and agitation in the step (B) is performed by a static mixing means. It is possible to convert the fatty acid glycerides into fatty acid alkyl esters efficiently by using a static mixing means. In addition, the present invention provides the method of producing fatty acid alkyl esters, wherein the static mixing means is operated at a linear velocity of 1.4 m/sec or more. Thus, it is possible to convert the fatty acid glyceride into fatty acid alkyl esters efficiently and rapidly.

The present invention also provides a system of producing fatty acid alkyl esters, at least comprising a pretreatment unit of removing at least water from an oil/fat raw material containing fatty acid glycerides, a reaction unit of converting the fatty acid glycerides into fatty acid alkyl esters and reducing the triglyceride content in the fatty acid alkyl esters obtained to 0.1 wt % or less by fine-particle dispersion and agitation, and a separating apparatus of separating impurities from the mixture containing the fatty acid alkyl esters. It is thus possible to produce high-purity fatty acid alkyl esters efficiently.

In the present invention, the "fatty acid glycerides" includes fatty acid triglycerides, fatty acid diglycerides, and fatty acid monoglycerides. The "oil/fat raw material" is a raw material containing the fatty acid glycerides above, and examples thereof include all vegetable and animal oils/fats, the waste oils/fats thereof, and others.

Effects of the Invention

It is possible to remove impurities such as water efficiently by the method of producing fatty acid alkyl esters according to the present invention. It is thus possible to prevent the side reactions, such as ester-exchange reaction and esterification reaction, caused by the impurities such as water. Accordingly, it is possible to obtain high-purity fatty acid alkyl esters at high yield and at high reaction efficiency.

BEST MODE FOR CARRYING OUT THE INVENTION

Hereinafter, favorable embodiments of the present invention will be described with reference to attached drawings. The embodiments in respective drawings are only typical embodiments of the present invention, and the present invention is not restricted by these drawings by any means.

FIG. 1 is a flow chart showing an example of the method of producing fatty acid alkyl esters according to the present invention.

First, an oil/fat raw material is pretreated for removal of at least water (step A). Then, the fatty acid glycerides contained in the pretreated oil/fat raw material are converted to fatty acid alkyl esters (step B). Then, a step of removing impurities from the mixture is carried out. In the final step, the fatty acid alkyl esters obtained are converted to and stored as a final product of biodiesel fuel.

An example of the reaction used in the method of producing fatty acid alkyl esters according to the present invention is shown in the following Formula (1). In the reaction, the fatty acid glycerides contained in the oil/fat raw material are converted to fatty acid methyl esters (biodiesel fuel) and glycerol in ester-exchange reaction with methanol (alcohol). The reaction proceeds in the presence of an alkali catalyst potassium hydroxide.

[Formula 1]

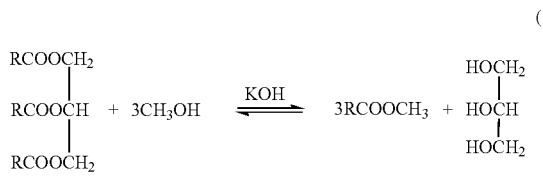

(1)

In Formula (1) above, R represents a hydrocarbon group or a hydrogen atom (H), and specifically, the number of carbons is also not restricted, and R may have a carbon-carbon unsaturated bond and may be substituted with one or more other functional groups such as alkoxy groups.

The alcohol used in the method of producing fatty acid alkyl esters according to the present invention is not restricted to methanol. Thus, the number of carbons of the alcohol is not restricted, and the alcohol may have a carbon-carbon unsaturated bond or may be substituted with other functional groups. In addition, the alkali catalyst used in the method of producing fatty acid alkyl esters according to the present invention is not restricted to potassium hydroxide (KOH). It may be sodium hydroxide (NaOH) or the other alkali catalyst.

Impurities that may cause side reactions during the ester-exchange reaction include ($H_2O$), free fatty acids (RCOOH), alkali soaps (RCOOK), and the like. The free fatty acids (RCOOH) are generated by hydrolysis of the fatty acid alkyl esters and by oxidation of the fatty acid glycerides contained in the oil/fat raw material. Water is contained in the oil/fat raw material containing fatty acid glycerides derived from vegetables (such as soybean and rapeseed), contaminated from outside after initiation of the reaction and also generated in side reactions of the ester-exchange reaction (see Formula (1)). The water is also problematic, for example, because it leads to hydrolysis of the fatty acid alkyl esters.

The step A is a pretreatment step of removing at least water from an oil/fat raw material containing fatty acid glycerides (see FIG. 1). For example, it is possible to improve the reaction efficiency and the yield of the ester-exchange reaction, by removing the impurities contained in the oil/fat raw material (such as water) effectively in the pretreatment step (step A) before processing to the fatty acid alkyl esters in the conversion step (step B).

In the present invention, the method of removing water and others in the step A is not restricted, and may be, for example, a method of removing water and others by applying voltage to the oil/fat raw material or a method of removing water as a low-boiling component from the oil/fat raw material (low-boiling-component removal). The step is more favorably carried out under vacuum deaeration, form the viewpoint of dehydration efficiency.

The step B is a step of converting the fatty acid glycerides contained in the oil/fat raw material pretreated in the step A to fatty acid alkyl esters (see FIG. 1). More specifically, it is a step of converting the fatty acid glycerides contained in the oil/fat raw material to fatty acid alkyl esters and giving fatty acid alkyl esters having a triglyceride content of 0.1 wt % or less by fine-particle dispersion and agitation. When the reaction product obtained in fatty acid alkyl ester-converting reaction is phase-separated, the fatty acid alkyl ester phase obtained has a triglyceride content of 0.1 wt % or less.

In the present invention, the reaction carried out in the step B is not restricted, and the raw material may be converted into the fatty acid alkyl esters in multiple reactions. The fatty acid alkyl esters are favorably prepared mainly by ester-exchange reaction of the fatty acid glycerides. It is because the fatty acid glycerides are contained in the oil/fat raw material in a great amount and the fatty acid alkyl esters are converted directly from the fatty acid glycerides at high efficiency (see Formula (1)), giving a mixture containing fatty acid alkyl esters.

In the present invention, the ester-exchange reaction of the fatty acid glycerides is also not restricted. It may be, for example, an acid-catalyzed method of using an acid catalyst or a supercritical methanolytsis method using no catalyst, but the fatty acid glycerides are preferably ester-exchanged with an alcohol in the presence of an alkali catalyst (alkali-catalyzed method). Alternatively, it may be combination of the acid-catalyzed method and the alkali-catalyzed method.

In the ester-exchange reaction by the alkali-catalyzed method, a metal alcoholate, which is previously prepared in reaction of an alcohol and an alkali metal, is preferably added to the fatty acid glycerides. For example, a metal alcoholate may be prepared in a preliminary tank and then fed into a reaction tank containing the raw oil/fat.

If the pretreatment step is insufficient as before, there are water, free fatty acids and others remaining in the fatty acid glycerides (oil/fat raw material), and thus, the ester-exchange reaction should be repeated multiple times in the reaction tank. However because water is removed sufficiently in the pretreatment step in the present invention (step A), it is possible, for example, to reduce the number of the ester-exchange reactions; and thus, the inventive method is efficient and economical.

In the present invention, fine-particle dispersion and agitation is performed in the step B. It is possible to improve the contact efficiency by pulverizing the reaction product into fine particles and dispersing and agitating the particles in the reaction system of the fatty acid glycerides and the metal alcoholate. In particular, when the reaction is a solid/liquid heterogeneous reaction, dispersion and agitation after pulverization into fine particles is effective, for example, in increasing contact surface area and thus allows more efficient reaction.

The means for the fine-particle dispersion and agitation is not particularly restricted, if it allows pulverization of the reaction product into fine particles and agitation thereof, and examples thereof include ultrasonic irradiation, electrostatic induction and others, but static dispersion mixing is preferable. The static dispersion mixing is carried out, for example, by using a static mixer.

If fatty acid alkyl esters are to be prepared by using a monovalent alcohol in the step B above, it is preferable to use a monovalent alcohol in an amount of 5 moles or less with respect to 1 mole of the oil/fat raw material in the reaction, more favorably in an amount of 4 moles or less. For example in Formula 1, the amount of the monovalent alcohol theoretically needed is 3 moles with respect to 1 mole of the fatty acid glycerides. However, in practical production of BDF and others, a greater amount of alcohol is needed traditionally for favorable progress of the ester-exchange reaction. More specifically, a great amount of alcohol with respect to 1 mole of the oil/fat raw material is required. In contrast, the present invention allows progress of the reaction in the step B even with a small amount of alcohol and is thus more cost-effective and also advantageous in increasing the stability of the production line.

The molecular weight of various oil/fat raw materials described, for example, in "Biodiesel: The Comprehensive Handbook, Martin Mittelbach, Claudia Remschmidt, Publisher: Martine Mittelbach Paperback, 2004" may be used in the present invention. For example, various oil/fat raw materials and their molecular weights are shown in Table 1. It should be understood that the oil/fat raw materials for use in the present invention are not restricted to the fats and oils listed below.

TABLE 1

| Oil | Average molecular weight |
| --- | --- |
| Rapeseed oil | 883 |
| Castor oil | 921 |
| Coconut oil | 638 |
| Corn oil | 871 |
| Palm oil | 847 |

In practical production of BDF and others, the reaction should have been repeated multiple times for sufficient progress of the ester-exchange reaction. For example, an esterification reaction is performed in a reaction tank, to give a reaction product, and the reaction product is fed after crude purification into the reaction tank once again. However, repetition of the reaction for multiple times is undesirable, because it leads to elongation of the production period and also to complication of the processing operation and the apparatus structure, and deterioration in energy efficiency.

In the present invention, when the fatty acid alkyl esters are prepared by using a monovalent alcohol, the monovalent alcohol is preferably reacted in an amount of 5 moles or less with respect to 1 mole of the oil/fat raw material.

It is thus possible to obtain fatty acid alkyl esters efficiently and rapidly according to the present invention. In particular, the method can be used in a large-scale production system for BDF fuel.

The static dispersion mixing is desirably performed at a linear velocity of 1.4 m/sec or more in the step (B). For example if the static mixer described above is used, the reaction product is preferably forced to flow in the static mixer at a linear velocity of 1.4 m/sec or more, more favorably at a linear velocity of 1.5 m/sec or more. It is possible to advance the reaction more efficiently and rapidly at such a linear velocity.

After the fine-particle dispersion and agitation, for example, a separate extension pipe may be connected thereto. The structure and others of the extension pipe are not restricted, and an extension pipe in a suitable favorable structure may be connected.

After the step B, at least glycerol is removed in the step C. In the step B, the fatty acid alkyl esters are formed, and glycerol, a reaction by-product, is also formed simultaneously. It is a step of removing the glycerol. Impurities other than glycerol may be removed additionally in the step C. Further, the separation purification step may be repeated multiple times. The method of step C is not particularly restricted, and any one of known methods may be used. It is favorably a static separation step.

The static separation step may be carried out, after addition of a neutralization adsorbent to the mixture. The static separation step is specifically a liquid/liquid separation step of allowing static separation after addition of a neutralization adsorbent to the mixture containing the fatty acid alkyl esters. In this way, it is possible to separate glycerol remaining in the mixture and also trace amounts of impurities such as unreacted fatty acid glycerides (including triglycerides, diglycerides and monoglycerides), alcohols, free fatty acids, and water from the fatty acid alkyl esters.

For example when the ester-exchange reaction is carried out by the alkali-catalyzed method, it is possible to make the neutralization adsorbent, if used in the static separation step, function as a neutralizing agent neutralizing the mixture and also as a coagulant allowing aggregation sedimentation of the impurities during the static separation. It is thus possible to perform neutralization and static separation at the same time without separate addition of an additional neutralizing agent and obtain the fatty acid alkyl esters efficient and easily. Thus favorably, the static separation is performed after a neutralization adsorbent is added to and stirred in the mixture.

When the neutralization adsorbent is added to the mixture, impurity particles in the mixture aggregate and flocculate therein. The flocculated impurities sediment and are removed. Thus, the impurities are removed by sedimentation effectively, both by static gravitational separation and adsorption separation caused by the neutralization adsorbent added. In the present invention, the static separation tank used in the step is not particularly restricted, but favorably a static separation tank equipped with a stirrer. Alternatively, an integrated static mixer allowing agitation of the reaction solution for ester-exchange reaction and also subsequent agitation of the neutralization adsorbent and others additionally added may be used. The impurities are adsorbed and aggregated effectively, because the mixture can be mixed sufficiently by agitation after addition of a neutralization adsorbent.

When the mixture and the neutralization adsorbent are mixed, agitated, and left for a particular time, the fatty acid methyl ester phase and the other impurity phase separate from each other. The fatty acid methyl ester phase, which is lower in specific density, separates then as the upper layer, while the impurity phase, which is higher in specific density, as the lower layer. Accordingly, it is possible to discharge the impurity phase easily by connecting a drainage tube or the like to the lower part of the static separation tank.

Because the ester-exchange reaction gives fatty acid alkyl esters as well as glycerol, the impurity phase contains glycerol in a great amount (see Formula (1)). Thus, glycerol may be separated from the impurity phase discharged from the drainage tube and reused in other applications.

In the present invention, the kind and others of the neutralization adsorbent are not restricted, and the absorbent may be, for example, clay or montmorillonite, but favorably, it contains activated clay as the principal component. Activated clay may be used alone or in combination with another neutralization adsorbent. Use of the activated clay, which has a function to neutralize the reaction solution containing an alkali metal catalyst and also a function to aggregate the impurity by adsorption, is favorable in the ester-exchange reaction. Thus, addition of activated clay immediately after completion of the reaction is cost-effective and convenient, from the point of simultaneous progress of neutralization of the reaction solution and removal of the impurities by sedimentation.

In the present invention, the shape and others of the activated clay are not particularly restricted, and the activated clay may be granular or powdery. The surface area of the activated clay used in the present step is desirably larger, for the activated clay to exhibit both the neutralization and adsorption actions simultaneously in contact with impurities. In addition, the activated clay preferably has a particular size for favorable aggregation by specific density and for prevention of clogging of the device and others. Thus, an activated clay having a favorable size can be selected properly, considering these points according to the devices, raw materials and others used.

Alternatively, a step of removing impurities may be carried out separately by applying voltage to the mixture containing fatty acid alkyl esters as the step C. Trace amounts of water, free fatty acids and others not separated in the static separation step can be removed from the fatty acid alkyl esters. Specifically, it is possible to collect and separate impurities such as water that accumulate around the electrodes by its electro-osmotic action by applying voltage between the anode and cathode installed in the impurity-removing apparatus containing the mixture.

Application of voltage to the mixture favorably leads to accumulation of water and other impurities such as free fatty acids around the electrodes and thus, efficient collective removal of the impurities. Heating of the mixture containing fatty acid alkyl esters at high temperature often generates free fatty acids and others, but there is no such a problem in the method of applying voltage. It is thus possible to obtain fatty acid alkyl esters more efficiently and at higher purity by this method than by the impurity-removing method by distillation dehydration.

It is possible in particular to remove solid impurities such as the neutralization adsorbent efficiently, by carrying out a step of removing impurities from the mixture separately as the step C. Thus in the present invention, the method of removing impurities from the mixture is not particularly restricted, and may use a filtration apparatus, a centrifugal separator, or the like. Further in the present invention, the method of filtering in the filtration apparatus is also not restricted, but favorable is a filtering method by using a filter. It is possible to filter trace amounts of impurities, such as the neutralization adsorbent not separated, easily and effectively with the filter.

The filter is a material having a separative power. The material thereof is, for example, a synthetic resin, paper, or the like; the shape and others of the material are not restricted; and favorable is a microfiltration filter superior in chemical resistance such as of polysulfone, polyamide, or a ceramic material. It may be possible to raise the separation efficiency, for example, by installing a pre-filter for ultrafiltration. The separative power above can be determined, considering the kind, shape and others of the neutralization adsorbent used in the static separation step.

The step of removing impurities from the mixture described above is favorably carried out after the step B, and the sequence of the steps when multiple steps are carried out is chosen adequately. Thus, the step sequence is determined properly according to the method in the step of removing impurities from the mixture. For example if the impurities are removed from the mixture by using a filter, it is possible to reduce the weight of each apparatus and control the production line easily, by forming and integrating such a filter, for example, on the internal wall of a high-voltage impurity-removing apparatus.

Alternatively, a separating apparatus, for example using a filter, may be installed separately between the static separation tank and the high-voltage impurity-removing apparatus. If such a separating apparatus for example using a filter is installed between the static separation tank and the high-voltage impurity-removing apparatus, it is possible to remove impurities such as aggregated activated clay first with the filter effectively and then to remove the residual trace amounts of water, free fatty acids and others by the high-voltage impurity-removing apparatus. It is thus possible to remove impurities efficiently, without significant load applied to the high-voltage impurity-removing apparatus or others.

Among the steps above, it is possible to remove water, free fatty acids and others efficiently, by performing processing first in the step A. In addition, it is possible to remove other impurities such as glycerol effectively by processing in the static separation step of adding a neutralization adsorbent. Further by processing in the separation step using a filter above, it is possible to remove the residual neutralization adsorbent and the impurities adsorbed on the aggregated neutralization adsorbent efficiently.

In addition, these steps may be carried out in combination or in repetition in the present invention according to the oil/fat raw material and alcohol used, considering the physical properties and the yields of the fatty acid alkyl esters, by-products, and others obtained. It is thus possible to produce the fatty acid alkyl esters further more efficiently at high purity.

The fatty acid alkyl esters thus purified are fed into the final product-producing step, wherein the esters are converted to the final product biodiesel fuel. For example, the fatty acid alkyl esters are mixed with additives such as combustion improver, to give a final product biodiesel fuel, which is then fed and stored in a biodiesel fuel stock tank. In the present invention, the combustion improver for use is not particularly restricted. For example, it may be an additive for prevention of oxidation or for improvement of the low-temperature flowability of the biodiesel fuel.

High-purity fatty acid alkyl esters are needed for use as a biodiesel fuel, and thus, it is important that the stock tank is effective in preserving the high-purity state of the fatty acid alkyl esters. In particular, the fatty acid alkyl esters are hydrophilic and can be mixed readily with water. The kind and other of the biodiesel fuel stock tank is not particularly restricted in the present invention, but favorably, it is preferably a completely dehydrated stock tank or a stock tank tightly sealed from external air. In addition, a small amount of light oil may be added to the fatty acid alkyl ester before storage.

In addition, a high-voltage impurity-removing apparatus for example may be connected to the stock tank, for preservation of the quality of the fatty acid alkyl esters stored in the biodiesel fuel stock tank. It is thus possible to remove impurities such as water contained in the fatty acid alkyl ester in the biodiesel fuel stock tank as needed, by processing in a high-voltage impurity-removing apparatus after processing in the pretreatment step (step A) to the final product-producing step. It is possible in this way to store the fatty acid alkyl esters in the high-purity state for an extended period of time.

In the method of producing fatty acid alkyl esters according to the present invention, no water is used in reaction and treatment, and water is removed from the production line as much as possible. Thus, production of a biodiesel fuel does not demand infrastructure for water supply, and thus, allows production of the biodiesel fuel, for example, even in dry areas. Further because the apparatuses used in respective steps are expensive and simple and the energy needed in these steps is small, it is a preferable production method, also from the point of life cycle assessment (LCA).

FIG. 2 is a schematic view illustrating an embodiment of the system of producing fatty acid alkyl ester according to the present invention.

Code 1 shown in FIG. 2 represents a production system for fatty acid alkyl esters. Hereinafter, each step in the production system 1 for the fatty acid alkyl esters will be described separately. An oil/fat raw material is fed into a pretreatment unit 111, wherein impurities such as water and free fatty acids are removed at high voltage. The oil/fat raw material is fed through a filtration apparatus 113 using a filter that is installed upstream of a pump 114, while the impurities therein is filtered (see step A in FIG. 1). In this way, installation of the filtration apparatus 113 allows efficient removal of the impurities in the raw material. It is possible to prevent troubles caused by deposition of the impurities on the pump 114, in particular by installing the filtration apparatus 113 upstream of the pump 114.

The raw material is then heated to a desired reaction temperature in an in-line heater 121 and then fed into a reaction unit 122, where it is subjected, for example, to ester-exchange reaction (see step B in FIG. 1). A metal alcoholate, which is previously prepared in reaction of an alcohol and an alkali metal, is added in a suitable amount and allowed to react with the oil/fat raw material in the reaction unit 122 for progress of the ester-exchange reaction.

After completion of the ester-exchange reaction in the reaction unit 122, the reaction solution is then processed in a neutralization adsorbent-mixing unit 131 having a static mixer, while activated clay is added thereto. The neutralization adsorbent-mixing unit 131 is preferably installed downstream of the static mixer. It is possible to increase the yield by leaving the solution still for a particular time after static mixing and then sending it to the following static separation tank 132. The residence time in the neutralization adsorbent-mixing unit 131 (period of the reaction product staying in the neutralization adsorbent-mixing unit 131) may be determined arbitrarily, according to the reaction condition, the apparatus installation environment and others.

It is possible in this way to neutralize the reaction solution and make the impurities in the reaction solution adsorbed easily and effectively, because activated clay is added to and stirred with the reaction product immediately after the ester-exchange reaction. After agitation, the reaction solution is sent into a static separation tank 132 for static separation. The impurity phase sedimented to the lower region of the static separation tank 132 may be discharged then as needed to outside through a drainage port 133.

The length L1 of reaction unit 122 of the static mixer (see FIG. 2) and the length L2 of the neutralization adsorbent-mixing unit 131 (see FIG. 2) are not particularly restricted in the present invention and may be determined properly according to the amount of the raw fat/oil used, reaction time, and others. The length L1 can be determined according to the reaction time of the reaction performed in the reaction unit 122 of the static mixer. For example, the reaction time in the reaction unit 122 is determined from the length L1 and the linear velocity of the static mixer.

It is possible to carry out each step in the static mixer more efficiently, by installing as needed weighing machines 123, 124, and 134 weighing the materials such as raw material, metal alcoholate and activated clay added to the static mixer respectively and controlling the reaction automatically according to the addition amounts thus determined.

The fatty acid methyl ester phase discharged after static separation is sent to a filter filtration apparatus 150, where the residual activated clay and the impurities adsorbed on the activated clay are removed (see FIG. 1). The solution is then fed into a high-voltage impurity-removing apparatus 140, where trace amounts of water and other impurities such as free fatty acids contained in the fatty acid methyl ester phase are removed out of the drainage port 141. Thus in the present invention, there may be a filtration apparatus installed between the static separation tank and the high-voltage impurity-removing apparatus. In the present invention, the high-voltage impurity-removing apparatus is installed as needed, and thus, may not be installed, depending on the production system used, the environment, and the reaction to be carried out.

The purified fatty acid methyl esters are then sent to a static mixer 161, where additives such as combustion improver are added to the fatty acid methyl ester for production of the final biodiesel fuel product (see FIG. 1). The final product is stored, as mixed for example with light oil, in a biodiesel fuel stock tank 162. Although not shown in the Figure, the high-voltage impurity-removing apparatus may be connected to the biodiesel fuel stock tank 162 for occasional dehydration processing as needed. The production system shown in FIG. 2 is only an example, and in the present invention, other favorable reaction apparatuses may be selected according to the oil/fat raw material, reaction condition and others, or the same processing may be repeated multiple times for improvement in separation power.

EXAMPLES

Hereinafter, tests conducted for verification of the effects of the present invention will be described. The Examples below are shown only for exemplification, and it should be understood that the present invention is not restricted thereby.

<1. Verification of the Effects of Dehydration Pretreatment and Fine-Particle Dispersion and Agitation>

Processing in the presence or absence of the dehydration pretreatment (step A) or the fine-particle dispersion and agitation (step B) for conversion to fatty acid alkyl esters was verified.

Example 1

A rapeseed oil commonly used for production of BDF (bleached oil, water content: 2.0 wt %) was used as the raw oil/fat material. Methanol was used as the alcohol. Potassium hydroxide was used as the catalyst. The ratio of raw fat/oil:methanol:potassium hydroxide was 100:13:1.3 (by weight). First, the raw oil/fat was previously dehydrated under vacuum. The ester-exchange reaction was performed by using a static mixer enabling fine-particle dispersion and agitation. The reaction was performed in the static mixer for 0.8 second. The reaction was carried out between 42 g of a metal alkoxide prepared from methanol and potassium hydroxide and 300 g of the raw fat/oil.

Comparative Examples 1 and 2

Processing with dehydration pretreatment but without fine-particle dispersion and agitation was verified.

In a typical reaction condition, the test was performed in a similar manner to Example 1, except that the ester-exchange reaction was performed with a common stirring apparatus, instead of the static mixer, for 3 seconds (Comparative Example 1) or for 60 minutes (Comparative Example 2).

Comparative Example 3

Processing without dehydration pretreatment and also without fine-particle dispersion and agitation was verified.

In a typical reaction condition, the test was performed in a similar manner to Example 1, except that the raw fat/oil was not dehydrated in pretreatment and the ester-exchange reaction was carried out with a common stirring apparatus, instead of the static mixer, for 3 seconds.

[Evaluation Method]

For evaluation of dehydration pretreatment, the water content of the raw fat/oil dehydrated in pretreatment was determined (Example 1 and Comparative Example 1). The water content was determined by Karl Fischer volumetric titration method.

For evaluation of reaction yield, the contents of the unreacted reaction component triglyceride (TG) and partially unreacted components, diglyceride (DG) and monoglyceride (MG), were determined. Specifically, the reaction mixture after reaction was left still for 24 hours for static separation, to give methyl ester phase. The contents of TG, DG, and MG in the methyl ester phase were determined by GC/MS (according to EN 1410). The contents of TG, DG, and MG respectively in the entire methyl ester phase were calculated. These results are summarized in Table 2.

TABLE 2

| | Dehydration pretreatment | Water content w/w % | TG w/w % | DG w/w % | MG w/w % |
|---|---|---|---|---|---|
| Example 1 | Yes | 0.03 | 0.1 or less | 0.07 | 0.28 |
| Comparative Example 1 | Yes | 0.04 | 22.8 | 4.7 | 1.00 |
| Comparative Example 2 | Yes | 0.04 | 10.9 | 2.1 | 0.6 |
| Comparative Example 3 | No | 2.00 | 62.3 | 6.4 | 0.80 |

TG: Triglyceride
DG: Diglyceride
MG: Monoglyceride

[Discussion]

The TG content in Comparative Example 3 without dehydration pretreatment was highest at 62.3% (by weight). In Comparative Examples 1 and 2 with dehydration pretreatment but without fine-particle dispersion and agitation, the TG contents were respectively 22.8% (by weight) and 10.9% (by weight), showing some but insufficient improvement in TG content, compared with Comparative Example 3.

In contrast in Example 1 with dehydration pretreatment and also with fine-particle dispersion and agitation, the TG content was significantly lower at 0.1% or less. In addition, the contents of DG and MG were also significantly lower. The results of Example 1 suggested that it was possible to obtain high-purity fatty acid alkyl esters in a short period of time without multiple repeated ester-exchange reactions.

<2. Verification of Fine-Particle Dispersion and Agitation>

The influence of the condition of the fine-particle dispersion and agitation was evaluated. Specifically, a static mixer was used as the static mixing means in fine-particle dispersion and agitation, and, for example, the amount of methanol used with respect to the raw fat/oil was evaluated.

Examples 2 to 5

The reaction was carried out, while the molar ratio of raw fat/oil:methanol was changed under the condition shown in Table 2. The test was performed in a similar manner to Example 1, except that the linear velocity of the static mixer and the residence time of the reaction product therein were modified under the condition shown in Table 2 condition. The molecular weight of the rapeseed oil used in calculation was 883, and the molecular weight of methanol was 34.04.

The TG content was also evaluated in a similar manner to Example 1. The results obtained in Examples 2 to 6 are summarized in Table 3.

TABLE 3

| | Oil/fat:methanol (molar ratio) (by weight) | Linear velocity (m/S) | Residence time (S) | TG (w/w %) |
|---|---|---|---|---|
| Example 2 | 1:5.00 (100:18) | 1.41 | 0.68 | <0.1 |
| Example 3 | 1:4.16 (100:15) | 1.97 | 0.49 | 0.1 |
| Example 4 | 1:4.16 (100:15) | 1.53 | 1.12 | <0.1 |
| Example 5 | 1:3.61 (100:13) | 1.75 | 0.98 | <0.1 |

[Discussion]

The residual TG content was 0.1 wt % or less in each of Examples 2 to 5, even though the amount of methanol used was 5 moles or less. It was also possible to complete most of the reaction at a linear velocity of 1.4 m/S or more. The residence time in each of Examples 2 to 5 was approximately 1 second. The results above indicated that it was possible to advance the reaction efficiently with a small amount of alcohol in a short period of time in the Examples above.

INDUSTRIAL APPLICABILITY

The present invention is applicable as a method of producing high-quality fatty acid alkyl esters usable as a biodiesel fuel at high reaction efficiency and at high yield.

BRIEF DESCRIPTION OF THE DRAWINGS

FIG. 1 is a flow chart showing an example of the method of producing fatty acid alkyl esters according to the present invention.

FIG. 2 is a schematic diagram illustrating an embodiment of the production system for producing fatty acid alkyl esters according to the present invention.

EXPLANATION OF REFERENCES

| | |
|---|---|
| 1: | System of producing fatty acid methyl esters |
| 111: | Pretreatment unit |
| 122: | Reaction unit |
| 132: | Static separation tank |
| 140: | High-voltage impurity-removing apparatus |
| 113 or 150: | Filter filtration apparatus |
| 162: | Biodiesel fuel stock tank |

The invention claimed is:

1. A method of producing fatty acid alkyl esters containing 0.1 wt % or less triglyceride, at least comprising:
   (A) a step of removing at least water from an oil/fat raw material to a water content in the oil/fat raw material, as determined by Karl-Fischer volumetric titration, of 0.03 wt % or less; and
   (B) a step of converting fatty acid glycerides contained in the oil/fat raw material into fatty acid alkyl esters in the presence of an alkali catalyst and alcohols and reducing triglyceride content in the fatty acid alkyl esters obtained to 0.1 wt % or less by using a static mixing means at a linear velocity of 1.4 m/sec or more, and wherein the alcohols are used in an amount of 5 moles or less with respect to 1 mole of the oil/fat raw material in the step (B).

2. The method of producing fatty acid alkyl esters according to claim 1, further comprising:
   a step (C) following after the step (B), wherein,
   in the step (C) at least glycerol is separated from a mixture containing the fatty acid alkyl ester.

3. The method of producing fatty acid alkyl esters according to claim 2, wherein the step (B) is not repeated after the step (C).

4. The method of producing fatty acid alkyl esters according to claim 2, wherein;
   the step (C) separates at least glycerol by using a neutralization adsorbent.

5. The method of producing fatty acid alkyl esters according to claim 2, comprising a further purification step using a high-voltage impurity-removing apparatus following after the step (C).

6. The method of producing fatty acid alkyl esters according to claim 1, wherein the step (B) of converting the fatty acid glycerides in the oil/fat raw material into the fatty acid alkyl esters includes fine particle dispersion and agitation.

7. The method of producing fatty acid alkyl esters according to claim 1, wherein the alcohols are used in an amount of 3 moles with respect to 1 mole of the oil/fat raw material.

* * * * *